(12) United States Patent
Chen et al.

(10) Patent No.: US 9,372,586 B2
(45) Date of Patent: Jun. 21, 2016

(54) TOUCH DISPLAY

(71) Applicant: HengHao Technology Co. LTD, Hsinchu County (TW)

(72) Inventors: Chi-An Chen, Taipei (TW); Ming-Chuan Chih, Hsinchu County (TW)

(73) Assignee: Henghao Technology Co., Ltd., Hukou Township, Hsinchu County (TW)

( * ) Notice: Subject to any disclaimer, the term of this patent is extended or adjusted under 35 U.S.C. 154(b) by 105 days.

(21) Appl. No.: 14/331,071

(22) Filed: Jul. 14, 2014

(65) Prior Publication Data

US 2015/0363020 A1 Dec. 17, 2015

(30) Foreign Application Priority Data

Jun. 17, 2014 (TW) .............................. 103120783 A

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
CPC ....... G06F 3/041; G06F 3/0412; G06F 3/044; G06F 3/045; G06F 3/0488; G06F 2203/04111; G06F 2203/04112; G08C 21/00
See application file for complete search history.

(56) References Cited

U.S. PATENT DOCUMENTS

| | | | | |
|---|---|---|---|---|
| 2006/0017707 A1* | 1/2006 | Fukui | ...................... | G06F 3/045 345/173 |
| 2008/0062142 A1* | 3/2008 | Furukawa | ............... | G06F 3/045 345/173 |
| 2008/0231959 A1* | 9/2008 | Grip | .................. | G02F 1/133502 359/609 |
| 2009/0188726 A1* | 7/2009 | Chang | .................... | G06F 3/045 178/18.03 |
| 2010/0156840 A1* | 6/2010 | Frey | ........................ | G06F 3/044 345/174 |
| 2012/0169648 A1* | 7/2012 | Luo | .................... | G02B 27/2214 345/174 |
| 2012/0242613 A1* | 9/2012 | Hsu | ........................ | G06F 3/044 345/174 |
| 2013/0059128 A1* | 3/2013 | Jiang | ....................... | G06F 3/044 428/195.1 |
| 2013/0127776 A1* | 5/2013 | Guard | .................. | G06F 3/0412 345/174 |
| 2014/0152580 A1* | 6/2014 | Weaver | .................. | G06F 3/041 345/173 |
| 2014/0168092 A1* | 6/2014 | Yilmaz | .................. | G06F 3/044 345/173 |
| 2014/0375910 A1* | 12/2014 | Tada | ...................... | G06F 3/044 349/12 |
| 2015/0090395 A1* | 4/2015 | Lin | ....................... | G06F 1/1692 156/239 |
| 2015/0123911 A1* | 5/2015 | Poliakov | ................. | G06F 3/041 345/173 |

FOREIGN PATENT DOCUMENTS

KR 1020130059916 6/2013
KR 1020130119256 10/2013

* cited by examiner

*Primary Examiner* — Joe H Cheng
(74) *Attorney, Agent, or Firm* — Donald E. Stout; Stout, Uxa & Buyan, LLP

(57) ABSTRACT

A touch display includes a display module and a touch module. The touch module includes a first three-layer electrode structure and a transparent cover substrate, wherein the first three-layer electrode structure is disposed above a polarizer, and the transparent cover substrate is disposed above the first three-layer electrode structure. The first three-layer electrode structure includes a bottom index matching layer, a mesh electrode layer and a top index matching layer, wherein the mesh electrode layer is sandwiched between the bottom index matching layer and the top index matching layer.

18 Claims, 4 Drawing Sheets

TOUCH DISPLAY

This application claims the benefit of foreign priority to Taiwan application No. 103120783, filed on Jun. 17, 2014. The content of which is incorporated herein by reference.

BACKGROUND OF THE INVENTION

1. Field of the Invention

The present invention generally relates to a touch display, and more particularly to a touch display with enhanced light transmittance.

2. Description of Related Art

Touch screens, as input/output devices that adopt sensing technology and display technology, have been widely employed in electronic devices such as portable or hand-held electronic devices.

A capacitor-based touch panel is a commonly used touch panel that utilizes capacitive coupling effect to detect touch position. Specifically, capacitance corresponding to the touch position changes and is thus detected, when a finger touches a surface of the touch panel.

An electrode layer of a conventional touch panel is ordinarily manufactured by forming patterned electrodes, e.g., rhombus electrodes, using an etch technique. The patterned electrodes, however, may be observed by users, that is, a trace phenomenon, when looking at the touch panel. Moreover, the patterned electrodes may also impact light transmittance.

A need has thus arisen to propose a novel touch display to improve the trace phenomenon and enhance light transmittance.

SUMMARY OF THE INVENTION

In view of the foregoing, it is an object of the embodiment of the present invention to provide a touch panel that utilizes a mesh electrode layer with index matching layers to effectively improve the trace phenomenon and substantially enhance light transmittance.

According to one embodiment, a touch display includes a display module having a polarizer disposed at top thereof; and a touch module disposed above the display module. The touch module includes a first three-layer electrode structure and a transparent cover substrate, the first three-layer electrode structure being disposed above the polarizer, and the transparent cover substrate being disposed above the first three-layer electrode structure. The first three-layer electrode structure includes a bottom index matching layer, a mesh electrode layer and a top index matching layer, the mesh electrode layer being sandwiched between the bottom index matching layer and the top index matching layer.

DETAILED DESCRIPTION OF THE INVENTION

Figure 1:
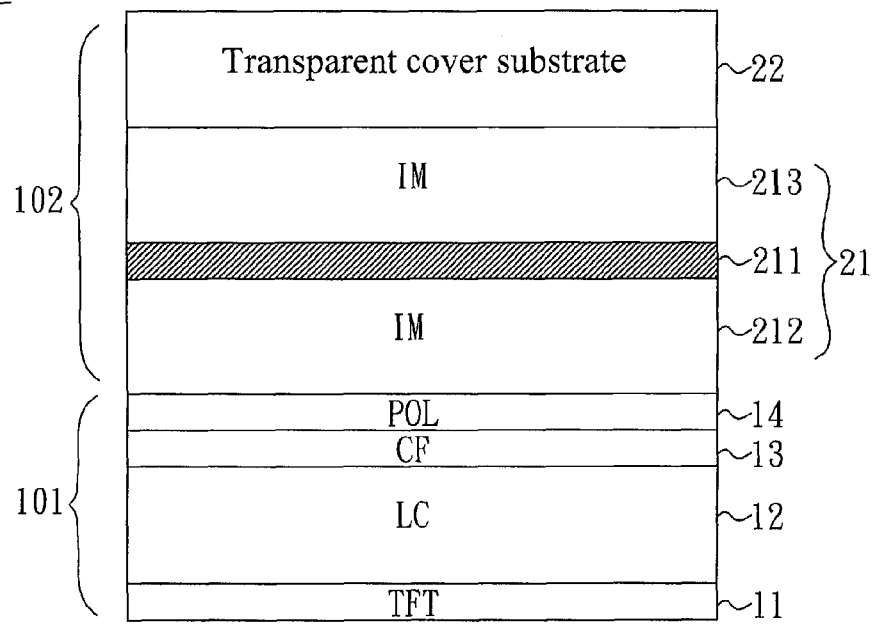
FIG. 1 shows a cross-sectional view of a touch display according to a first embodiment of the present invention.

FIG. 1 shows a cross-sectional view of a touch display 100 according to a first embodiment of the present invention. In order to comprehend aspects of the present invention, only layers pertinent to the embodiment have been shown. The touch display 100 of the embodiment includes a display module 101, and a touch module 102 disposed above the display module 101. In the specification, a term "top" refers to a direction directing to a display surface or a touch surface. The term "top" or "bottom" is used to connote a relate relation between elements, but is not used to involve a sequence of process.

In the embodiment, the display module 101 includes, from bottom to top, a thin-film-transistor (TFT) layer 11, a liquid crystal (LC) layer 12, a color filter (CF) layer 13 and a polarizer (POL) 14. The component elements of the display module 101 may be implemented by conventional techniques, which are hence omitted for brevity.

According to one aspect of the embodiment, a first three-layer electrode structure 21 may be disposed above the polarizer 14. The first three-layer electrode structure 21 may include a mesh electrode layer 211, which is sandwiched between a bottom (refractive) index matching (IM) layer 212 and a top index matching layer 213. Equivalently speaking, the first three-layer structure 21 may include, from bottom to top, the bottom index matching layer 212, the mesh electrode layer 211, and the top index matching layer 213. In the embodiment, no intermediate layer or element exists between any two component layers of the first three-layer electrode structure 21. In addition to the first three-layer electrode structure 21, the touch module 102 of the embodiment may further include a transparent cover substrate 22 disposed above the first three-layer electrode structure 21.

In the embodiment, no intermediate layer or element, except for an optically clear adhesive (OCA) layer (not shown), exists between the first three-layer electrode structure 21 and the polarizer 14. No intermediate layer or element, except for an optically clear adhesive (OCA) layer (not shown), exists between the first three-layer electrode structure 21 and the transparent cover substrate 22. For example, if the top index matching layer 213 is directly coated on a bottom surface of the transparent cover substrate 22, an OCA layer may be used to bond the bottom index matching layer 212 with the polarizer 14. A second example is that, if the bottom index matching layer 212 is directly coated on a top surface of the polarizer 14, an OCA layer may be used to bond the top index matching layer 213 with the transparent cover substrate 22. Equivalently speaking, either a top surface or a bottom surface of the first three-layer electrode structure 21 may be bonded with an OCA layer.

Figure 2:
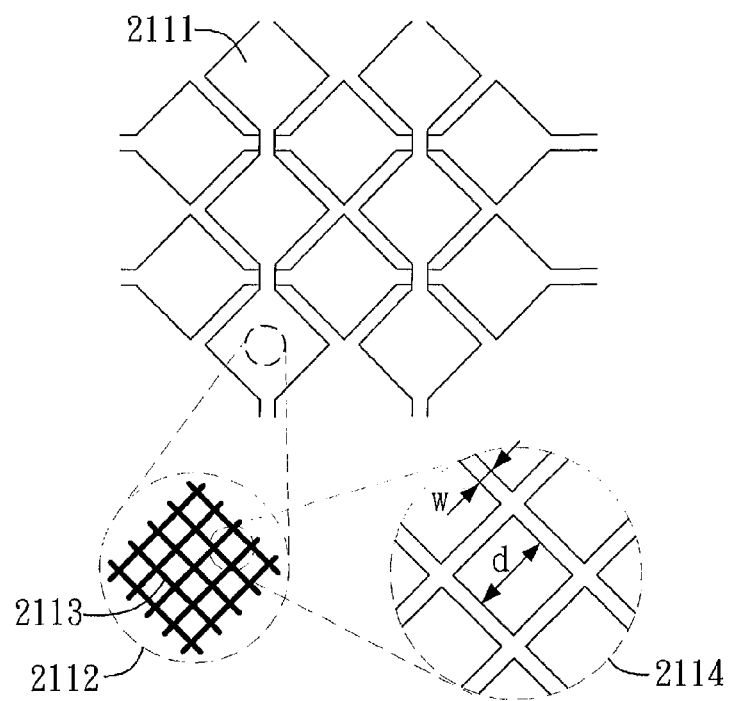
FIG. 2 shows a partial top view of the mesh electrode layer of FIG. 1.

FIG. 2 shows a partial top view of the mesh electrode layer 211, which may include plural patterned electrodes 2111. Although rhombus electrodes 2111 are exemplified in FIG. 2, electrodes of other shapes may be used instead. FIG. 2 also shows a partial enlarged view 2112 of an electrode 2111, showing a mesh structure composed of interwoven linear metals (or metal lines) 2113, which cross over each other to form lattices each having a transparent opening. The mesh electrode layer 211 of the embodiment may thus have enhanced light transmittance compared with a conventional electrode layer composed of patterned electrodes. The linear metal 2113 of the embodiment may be made of silver alloy or other metal alloy such as copper alloy. In another embodiment, the linear metal 2113 of the embodiment may be made of silver or other metal such as copper. FIG. 2 further shows a partial enlarged view 2114 of a lattice. In the embodiment, the linear metal 2113 may have a width w of about 1.5-10 micrometers, and the transparent opening of the lattice may have an inner diameter d of about 100-500 micrometers.

Figure 3A:
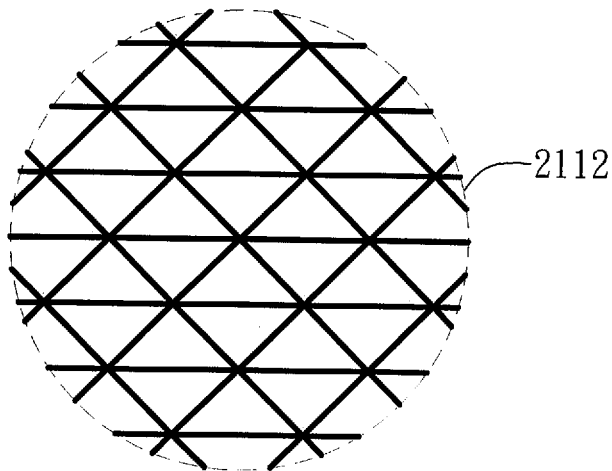
FIG. 3A, FIG. 3B and FIG. 3C show various lattice shapes of the mesh electrode layer of FIG. 1.
Figure 3B:
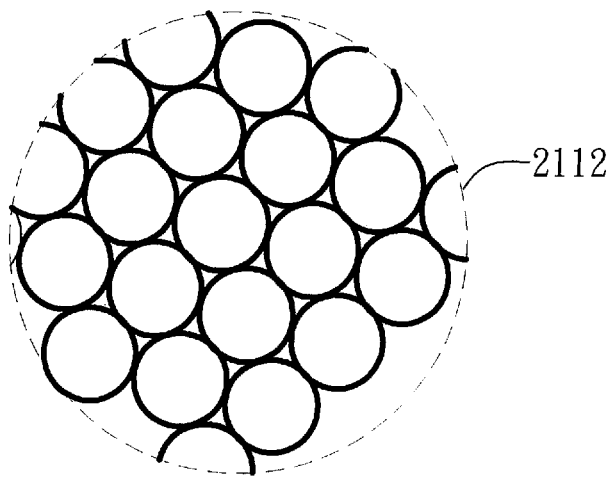
Figure 3C:
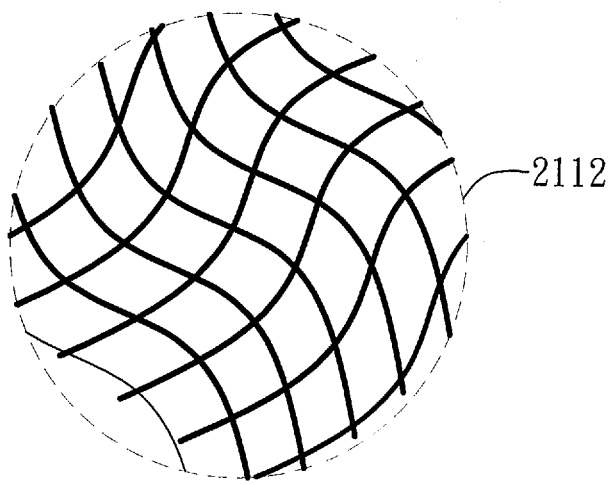

Although quadrilateral (e.g., rectangular) lattices are exemplified in FIG. 2, the lattices may have other shapes, such as a triangle shape (FIG. 3A), a circular shape (FIG. 3B) or an irregular shape (FIG. 3C).

Figure 4:
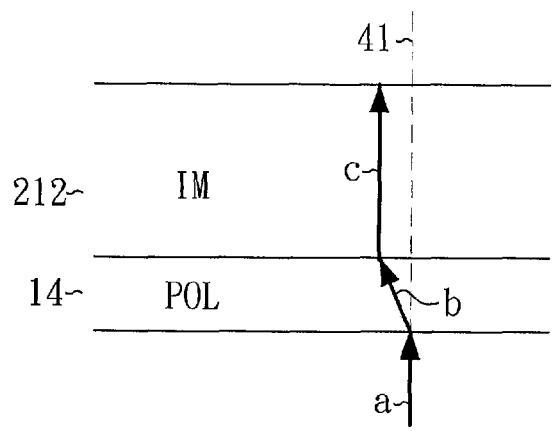
FIG. 4 shows an exemplary path of a light passing the bottom index matching layer of FIG. 1.

According to another aspect of the embodiment, the bottom index matching layer 212 and the top index matching layer 213 may be made of a transparent material, which may have refractive indices distinct from a refractive index of an externally neighboring layer (such as the transparent cover substrate 22 or the polarizer 14). Accordingly, a light deviated from a normal line with an angle caused by the externally neighboring layer may therefore be reversed back to the normal line, thereby enhancing light transmittance. For the foregoing reasons, the bottom index matching layer 212 and the top index matching layer 213 of the embodiment may be called compensation layers or light-transmittance enhancing layers. FIG. 4 exemplifies a light a entering the polarizer 14 to become a refracted light b, which is deviated from a normal line 41 with an angle. The light b then enters the bottom index matching layer 212 to become a refracted light c, which is reversed back to the normal line 41 due to index matching, thereby substantially enhancing light transmittance.

The first three-layer electrode structure 21 of the embodiment may have a total thickness of tens to hundreds angstroms. Specifically, the top index matching layer 213 may have a thickness different from a thickness of the bottom index matching layer 212. The top index matching layer 213 and the bottom index matching layer 212 may be made of a mixture of indium tin oxide (ITO) and metal (such as zinc). The top index matching layer 213 and the bottom index matching layer 212 may be made of other materials, such as silicon dioxide ($SiO_2$), indium tin oxide (ITO), titanium dioxide ($TiO_2$), Niobium oxide ($Nb_2O_5$), silicon oxynitride ($SiN_xO_y$) or zinc oxide (ZnO).

The transparent cover substrate 22 of the embodiment may be made of glass, or other materials such as Polycarbonate (PC), Polyethylene terephthalate (PET), Polyethylen (PE), Poly vinyl chloride (PVC), Poly propylene (PP), Poly styrene (PS), Polymethyl methacrylate (PMMA) or Cyclic olefin copolymer (COC).

Figure 5:
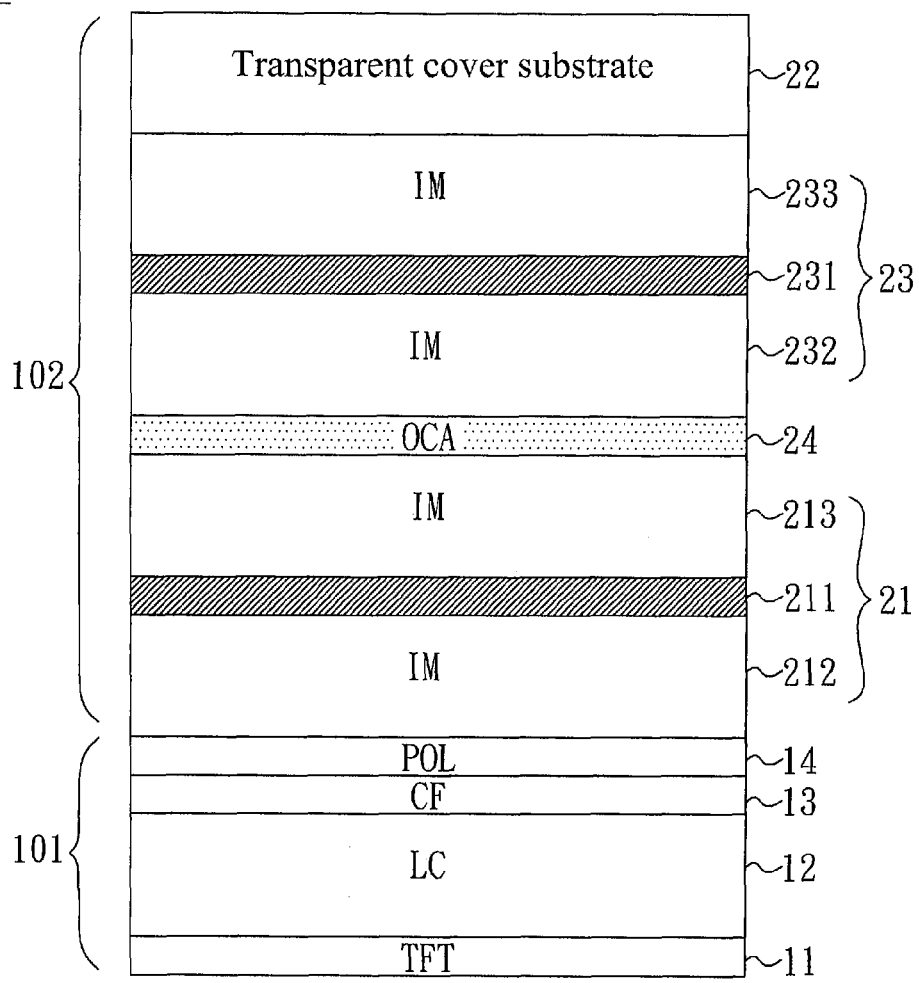
FIG. 5 shows a cross-sectional view of a touch display according to a second embodiment of the present invention.

FIG. 5 shows a cross-sectional view of a touch display 500 according to a second embodiment of the present invention. Same elements as the first embodiment (FIG. 1) are labeled with the same numerals, details of which are omitted for brevity. According one aspect of the embodiment, a second three-layer electrode structure 23 is further disposed between the first three-layer electrode structure 21 and the transparent cover substrate 22, and the second three-layer electrode structure 23 is bonded with the first three-layer electrode structure 21 via an optically clear adhesive (OCA) layer 24. The second three-layer electrode structure 23 may include a mesh electrode layer 231 sandwiched between a bottom (refractive) index matching layer 232 and a top index matching layer 233. Equivalently speaking, the second three-layer structure 23 may include, from bottom to top, the bottom index matching layer 232, the mesh electrode layer 231, and the top index matching layer 233. In the embodiment, no intermediate layer or element exists between any two component layers of the second three-layer electrode structure 23. The component elements of the second three-layer electrode structure 23 may have structures, materials and utilities being similar to the first three-layer electrode structure 21, and their details are omitted for brevity.

In the embodiment, no intermediate layer or element, except for an optically clear adhesive (OCA) layer (not shown), exists between the first three-layer electrode structure 21 and the polarizer 14. No intermediate layer or element, except for an optically clear adhesive (OCA) layer (not shown), exists between the second three-layer electrode structure 23 and the transparent cover substrate 22. For example, if the top index matching layer 233 (of the second three-layer electrode structure 23) is directly coated on a bottom surface of the transparent cover substrate 22, an OCA layer may be used to bond the bottom index matching layer 212 (of the first three-layer electrode structure 21) with the polarizer 14. A second example is that, if the bottom index matching layer 212 (of the first three-layer electrode structure 21) is directly coated on a top surface of the polarizer 14, an OCA layer may be used to bond the top index matching layer 233 (of the second three-layer electrode structure 23) with the transparent cover substrate 22. Equivalently speaking, either a top surface of the second three-layer electrode structure 23 or a bottom surface of the first three-layer electrode structure 21 may be bonded with an OCA layer.

Figure 6:
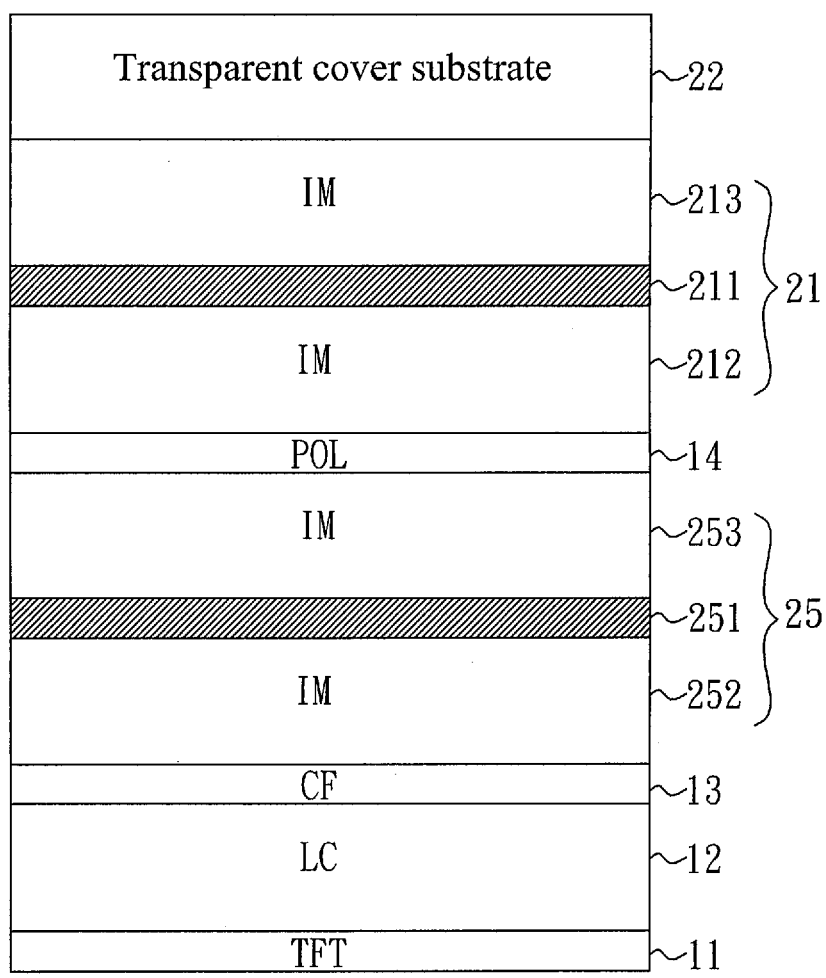
FIG. 6 shows a cross-sectional view of a touch display according to a third embodiment of the present invention.

FIG. 6 shows a cross-sectional view of a touch display 600 according to a third embodiment of the present invention. Same elements as the first embodiment (FIG. 1) are labeled with the same numerals, details of which are omitted for brevity. According one aspect of the embodiment, a third three-layer electrode structure 25 is further disposed between the polarizer 14 and the color filter layer 13. The third three-layer electrode structure 25 may include a mesh electrode layer 251 sandwiched between a bottom (refractive) index matching layer 252 and a top index matching layer 253. Equivalently speaking, the third three-layer structure 25 may include, from bottom to top, the bottom index matching layer 252, the mesh electrode layer 251, and the top index matching layer 253. In the embodiment, no intermediate layer or element exists between any two component layers of the third three-layer electrode structure 25. The component elements of the third three-layer electrode structure 25 may have structures, materials and utilities being similar to the first three-layer electrode structure 21, and their details are omitted for brevity.

In the embodiment, no intermediate layer or element, except for an optically clear adhesive (OCA) layer (not shown), exists between the third three-layer electrode structure 25 and the color filter layer 13. No intermediate layer or element, except for an optically clear adhesive (OCA) layer (not shown), exists between the first three-layer electrode structure 21 and the transparent cover substrate 22. For example, if the top index matching layer 213 (of the first three-layer electrode structure 21) is directly coated on a bottom surface of the transparent cover substrate 22, an OCA layer may be used to bond the bottom index matching layer 252 (of the third three-layer electrode structure 25) with the color filter layer 13. A second example is that, if the bottom index matching layer 252 (of the third three-layer electrode structure 25) is directly coated on a top surface of the color filter layer 13, an OCA layer may be used to bond the top index matching layer 213 (of the first three-layer electrode structure 21) with the transparent cover substrate 22. Equivalently speaking, either a top surface of the first three-layer electrode structure 21 or a bottom surface of the third three-layer electrode structure 25 may be bonded with an OCA layer.

Although specific embodiments have been illustrated and described, it will be appreciated by those skilled in the art that various modifications may be made without departing from the scope of the present invention, which is intended to be limited solely by the appended claims.

What is claimed is:

1. A touch display, comprising:
 a display module having a polarizer disposed at top thereof; and
 a touch module disposed above the display module, the touch module including a first three-layer electrode structure and a transparent cover substrate, the first three-layer electrode structure being disposed above the polarizer, and the transparent cover substrate being disposed above the first three-layer electrode structure;
 wherein the first three-layer electrode structure includes a bottom index matching layer, a mesh electrode layer and a top index matching layer, the mesh electrode layer being sandwiched between the bottom index matching layer and the top index matching layer;
 wherein the bottom index matching layer and the top index matching layer of the first three-layer electrode structure have refractive indices distinct from a refractive index of an externally neighboring layer, such that a light deviated from a normal line caused by the externally neighboring layer is therefore be reversed back to the normal line, thereby enhancing light transmittance.

2. The touch display of claim 1, wherein no intermediate layer exists between the bottom index matching layer and the mesh electrode layer of the first three-layer electrode structure, and no intermediate layer exists between the mesh electrode layer and the top index matching layer of the first three-layer electrode structure.

3. The touch display of claim 1, wherein no intermediate layer, except for an optically clear adhesive layer, exists between the first three-layer electrode structure and the polarizer.

4. The touch display of claim 1, wherein no intermediate layer, except for an optically clear adhesive layer, exists between the first three-layer electrode structure and the transparent cover substrate.

5. The touch display of claim 1, wherein the mesh electrode layer comprises a mesh structure composed of interwoven linear metals, which cross over each other to form lattices each having a transparent opening.

6. The touch display of claim 5, wherein the linear metal comprises silver alloy.

7. The touch display of claim 5, wherein the linear metal has a width of about 1.5-10 micrometers.

8. The touch display of claim 5, wherein the transparent opening of the lattice has an inner diameter of about 100-500 micrometers.

9. The touch display of claim 1, wherein the top index matching layer and the bottom index matching layer comprise a mixture of indium tin oxide (ITO) and metal.

10. The touch display of claim 1, wherein the top index matching layer and the bottom index matching layer comprise a mixture of indium tin oxide (ITO) and zinc.

11. The touch display of claim 1, wherein the top index matching layer is silicon dioxide ($SiO_2$), indium tin oxide (ITO), titanium dioxide ($TiO_2$), Niobium oxide ($Nb_2O_5$), silicon oxynitride ($SiN_xO_y$) or zinc oxide (ZnO); and the bottom index matching layer is silicon dioxide ($SiO_2$), indium tin oxide (ITO), titanium dioxide ($TiO_2$), Niobium oxide ($Nb_2O_5$), silicon oxynitride ($SiN_xO_y$) or zinc oxide (ZnO).

12. The touch display of claim 1, wherein the touch module further comprises:
 a second three-layer electrode structure disposed between the first three-layer electrode structure and the transparent cover substrate;
 wherein the second three-layer electrode structure includes a bottom index matching layer, a mesh electrode layer and a top index matching layer, the mesh electrode layer being sandwiched between the bottom index matching layer and the top index matching layer.

13. The touch display of claim 12, wherein no intermediate layer exists between the bottom index matching layer and the mesh electrode layer of the second three-layer electrode structure, and no intermediate layer exists between the mesh electrode layer and the top index matching layer of the second three-layer electrode structure.

14. The touch display of claim 12, wherein the touch module further comprises:
 an optically clear adhesive used to bond the second three-layer electrode structure with the first three-layer electrode structure.

15. The touch display of claim 12, wherein no intermediate layer, except for an optically clear adhesive layer, exists between the second three-layer electrode structure and the transparent cover substrate.

16. The touch display of claim 1, wherein the touch module further comprises:
 a third three-layer electrode structure disposed between the transparent cover substrate and a color filter layer which is disposed in the display module;
 wherein the third three-layer electrode structure includes a bottom index matching layer, a mesh electrode layer and a top index matching layer, the mesh electrode layer being sandwiched between the bottom index matching layer and the top index matching layer.

17. The touch display of claim 16, wherein no intermediate layer exists between the bottom index matching layer and the mesh electrode layer of the third three-layer electrode structure, and no intermediate layer exists between the mesh electrode layer and the top index matching layer of the third three-layer electrode structure.

18. The touch display of claim 16, wherein no intermediate layer, except for an optically clear adhesive layer, exists between the third three-layer electrode structure and the color filter layer.

* * * * *